United States Patent
Kadowaki et al.

(10) Patent No.: US 6,731,585 B2
(45) Date of Patent: May 4, 2004

(54) OPTICAL PICK-UP HEAD WITH SEMICONDUCTOR LASER

(75) Inventors: Shin-ichi Kadowaki, Hyogo (JP); Hideki Hayashi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 340 days.

(21) Appl. No.: 09/794,439

(22) Filed: Feb. 27, 2001

(65) Prior Publication Data

US 2001/0036142 A1 Nov. 1, 2001

(30) Foreign Application Priority Data

Mar. 3, 2000 (JP) ......................................... 2000-058465

(51) Int. Cl.⁷ ................................................. G11B 3/90
(52) U.S. Cl. ................. 369/116; 369/112.01; 369/59.1; 369/44.14
(58) Field of Search .................... 369/44.14, 112.01, 369/59.1, 116; 372/45–50; 250/214; 438/47.59

(56) References Cited

U.S. PATENT DOCUMENTS

| | | | | |
|---|---|---|---|---|
| 5,115,124 A | * | 5/1992 | Muto et al. | 250/214.1 |
| 5,321,275 A | * | 6/1994 | Shimizu et al. | 257/14 |
| 5,533,041 A | * | 7/1996 | Matsuda et al. | 372/50 |
| 5,566,142 A | | 10/1996 | Nakano et al. | |
| 5,581,523 A | | 12/1996 | Seki et al. | |
| 5,621,715 A | * | 4/1997 | Ohyama | 369/112.12 |
| 5,668,786 A | * | 9/1997 | Sasaki et al. | 369/13 |
| 5,680,384 A | | 10/1997 | Seki et al. | |
| 5,748,658 A | * | 5/1998 | Nakanishi et al. | 372/43 |
| 5,781,222 A | * | 7/1998 | Yamawaki et al. | 347/236 |
| 5,804,840 A | * | 9/1998 | Ochi et al. | 257/94 |
| 5,937,274 A | * | 8/1999 | Kondow et al. | 438/47 |
| 5,942,749 A | * | 8/1999 | Takeuchi et al. | 250/214.1 |
| 6,011,768 A | * | 1/2000 | Taguchi | 369/116 |
| 6,061,317 A | * | 5/2000 | Shodo | 369/54 |
| 6,150,189 A | * | 11/2000 | Pan | 438/59 |
| 6,324,314 B1 | * | 11/2001 | Ukechi et al. | 385/14 |
| 6,456,638 B1 | * | 9/2002 | Fukunaga | 372/45 |

FOREIGN PATENT DOCUMENTS

| | | |
|---|---|---|
| EP | 961372 | 12/1999 |
| JP | 6-290475 | 10/1994 |
| JP | 7-287857 | 10/1995 |
| JP | 8-45098 | 2/1996 |
| JP | 2675977 | 7/1997 |
| JP | 11-176003 | 7/1999 |
| JP | 12-12948 | 1/2000 |

* cited by examiner

Primary Examiner—Gautam R. Patel
(74) Attorney, Agent, or Firm—Merchant & Gould P.C.

(57) ABSTRACT

An optical pick-up head of the present invention includes a semiconductor substrate, a semiconductor laser mounted on the semiconductor substrate, a first photodetector for receiving a laser beam emitted from the semiconductor laser and reflected from an optical storage medium and outputting a current signal in accordance with the light amount of the received laser beam, and a current-voltage conversion circuit for converting the current signal to a voltage signal. The semiconductor laser is supplied with a high-frequency signal for preventing an output from fluctuating due to the laser beam reflected from the optical storage medium, and the photodetector and the current-voltage conversion circuit are formed on the semiconductor substrate.

5 Claims, 8 Drawing Sheets

OPTICAL PICK-UP HEAD WITH SEMICONDUCTOR LASER

BACKGROUND OF THE INVENTION

1. Field of the Invention

The present invention relates to an optical pick-up head and an information recording/reproducing apparatus.

2. Description of the Related Art

An optical memory technique using an optical disk with a pit pattern as a high-density and large-capacity storage medium has been put into practical use. Such an optical memory technique is utilized for a digital audio disk, a video disk, and a data file disk. A digital versatile disc (DVD) that is becoming widespread in recent years is a high-density optical disk using a semiconductor laser with a wavelength of 650 nm as a light source. Regarding DVDs, various media such as a DVD-ROM dedicated to reproduction, a write-once, read-many-times DVD-R, and a DVD-RAM that is recordable many times have been standardized.

Conventionally, various optical pick-up heads have been reported, which record and/or reproduce information with respect to the above-mentioned optical disks. As an example of a conventional optical pick-up head, the structure of an integrated optical pick-up head 100 disclosed in JP 2675977 is shown schematically in FIG. 8 (hatching is omitted).

Referring to FIG. 8, the optical pick-up head 100 includes a semiconductor substrate 101 and a laser diode 102. A photodiode 103 is formed on the semiconductor substrate 101.

The semiconductor substrate 101 is an n-type and has a concave portion. The laser diode 102 is a single-mode oscillation laser. The laser diode 102 is mounted in the concave portion of the semiconductor substrate 101 via an insulating layer 104. The photodiode 103 is formed on a side surface of the concave portion, and outputs a current depending upon the laser output from the laser diode 102. The current from the photodiode 103 is converted into a voltage signal by a resistor 105, and the voltage signal is output from a terminal 106. The voltage signal is input to a power control circuit from the terminal 106. The power control circuit controls the operating current flowing through the laser diode 102 so that the laser output from the laser diode 102 has a desired value. A voltage of +5 volts is applied to the semiconductor substrate 101 from a terminal 107 so as to supply a reverse bias voltage to the photodiode 103. The surface of the laser diode 102 that is in contact with the insulating layer 104 is connected to a terminal 108, and the opposite surface thereof is connected to a terminal 109. A high-frequency signal of hundreds of MHz is supplied from an npn transistor 110 to the terminal 109 so as to modulate the output from the laser diode 102. In the optical pick-up head 100, the output from the laser diode 102 is modulated, whereby the output from the laser diode 102 is prevented from fluctuating due to a laser beam that is reflected from an optical storage medium and is incident upon the laser diode 102.

The optical pick-up head 100 includes a photodetector for detecting a laser beam reflected from the optical storage medium. The optical pick-up head is miniaturized and produced easily by forming such a photodetector on the semiconductor substrate 101.

However, in the case of forming the photodetector on the semiconductor substrate 101, the photodetector is influenced by a high-frequency signal to cause an offset in a focus error signal and a tracking error signal. This is because a high-frequency signal applied to the laser diode 102 also is applied to the semiconductor substrate 101 via the insulating layer 104.

SUMMARY OF THE INVENTION

Therefore, with the foregoing in mind, it is an object of the present invention to provide an optical pick-up head applying a high-frequency signal to a semiconductor laser in which an offset is unlikely to occur in a focus error signal and a tracking error signal, and an information recording/reproducing apparatus using the optical pick-up head.

In order to achieve the above-mentioned object, the optical pick-up head of the present invention includes a semiconductor substrate; a semiconductor laser mounted on the semiconductor substrate; a photodetector for receiving a laser beam emitted from the semiconductor laser and reflected from an optical storage medium and outputting a current signal in accordance with a light amount of the received laser beam; and a current-voltage conversion circuit for converting the current signal into a voltage signal, wherein the semiconductor laser is supplied with a high-frequency signal for preventing an output from fluctuating due to the laser beam reflected from the optical storage medium, and the photodetector and the current-voltage conversion circuit are formed on the semiconductor substrate. According to this construction, the photodetector for receiving a laser beam reflected from the optical storage medium is formed on the semiconductor substrate on which the semiconductor laser is mounted. Therefore, an optical pick-up head is obtained in which characteristics are unlikely to be changed over time. Furthermore, in the above-mentioned optical pick-up head, a high frequency is applied to the semiconductor laser, so that an output of the semiconductor laser is stable. Furthermore, in the above-mentioned optical pick-up head, the photodetector and the current-voltage conversion circuit are formed on the semiconductor substrate on which the semiconductor laser is mounted. Therefore, the optical pick-up head is less influenced by a high-frequency signal input to the semiconductor laser. Therefore, an optical pick-up head is obtained in which an offset is unlikely to occur in a focus error signal and a tracking error signal.

In the above-mentioned optical pick-up head, the semiconductor substrate may be of a p-type. According to this construction, the semiconductor substrate can be grounded, so that the electric potential of the semiconductor substrate is stabilized, and the influence of a high-frequency signal in particular can be minimized.

In the above-mentioned optical pick-up head, the semiconductor laser may include a substrate and an active layer formed above the substrate, and the semiconductor laser may be mounted on the semiconductor substrate so that the active layer is closer to the semiconductor substrate than the substrate. According to this construction, heat generated by the semiconductor laser rapidly is transferred to the semiconductor substrate, so that an optical pick-up head with particularly high reliability can be obtained.

In the above-mentioned optical pick-up head, a frequency f1, at which a gain of the current-voltage conversion circuit becomes −3 dB, and a frequency f2 of the high-frequency signal may satisfy a relationship $f2/f1 \leq 5$. According to this construction, an optical pick-up head is obtained that allows information to be reproduced rapidly and has less unwanted emission.

Furthermore, the information recording/reproducing apparatus of the present invention for at least reproducing information from an optical storage medium includes: the above-mentioned optical pick-up head of the present invention; a driving unit for changing a relative position between the optical storage medium and the optical pick-up head; and a signal processing circuit for obtaining information recorded on the optical storage medium by using a signal output from the optical pick-up head. In the above-mentioned information recording/reproducing apparatus, the optical pick-up head of the present invention is used, so that an offset does not occur in a signal output from the current-voltage conversion circuit. As a result, a highly reliable information recording/reproducing apparatus can be realized.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings (hatching is omitted). It should be noted that the following embodiments are described for illustrative purpose, and the present invention is not limited thereto.
Embodiment 1

Figure 1:
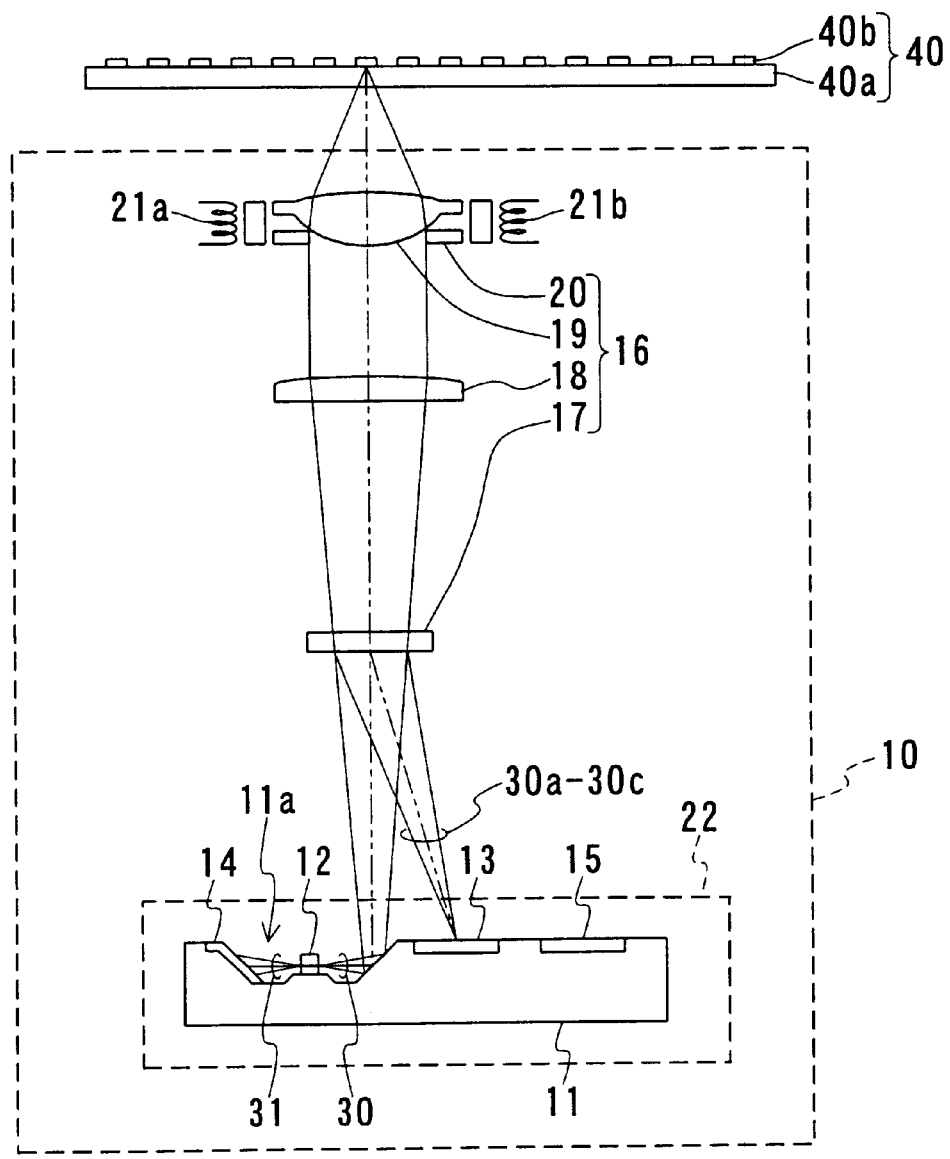
FIG. 1 is a diagram schematically showing an exemplary structure of an optical pick-up head of the present invention.
Figure 2:
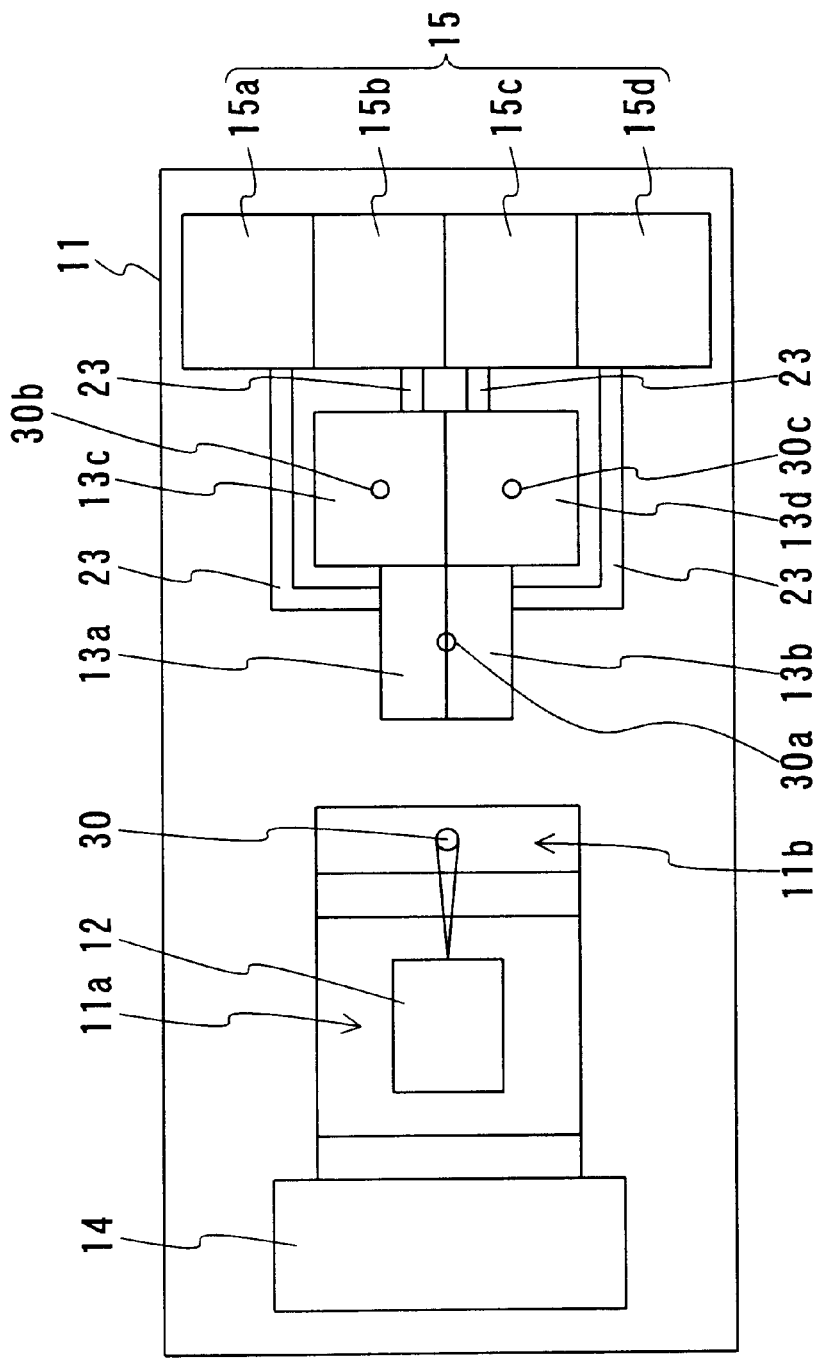
FIG. 2 is a top view of a semiconductor substrate of the optical pick-up head shown in FIG. 1.

In Embodiment 1, an exemplary optical pick-up head of the present invention is described. FIG. 1 schematically shows a structure of the optical pick-up head 10 of Embodiment 1. FIG. 2 is a top view schematically showing a semiconductor substrate 11.

The optical pick-up head 10 includes a semiconductor substrate 11, a semiconductor laser 12 mounted on the semiconductor substrate 11, a first photodetector 13, a second photodetector 14, and a current-voltage conversion circuit 15 formed on the semiconductor substrate 11, and an optical system 16. The optical system 16 includes a holographic optical element 17, a collimating lens 18, an objective lens 19, and an aperture 20. The optical pick-up head 10 further includes actuators 21a and 21b (which hereinafter may be referred to as an "actuator 21" collectively) for driving the objective lens 19.

Figure 3:
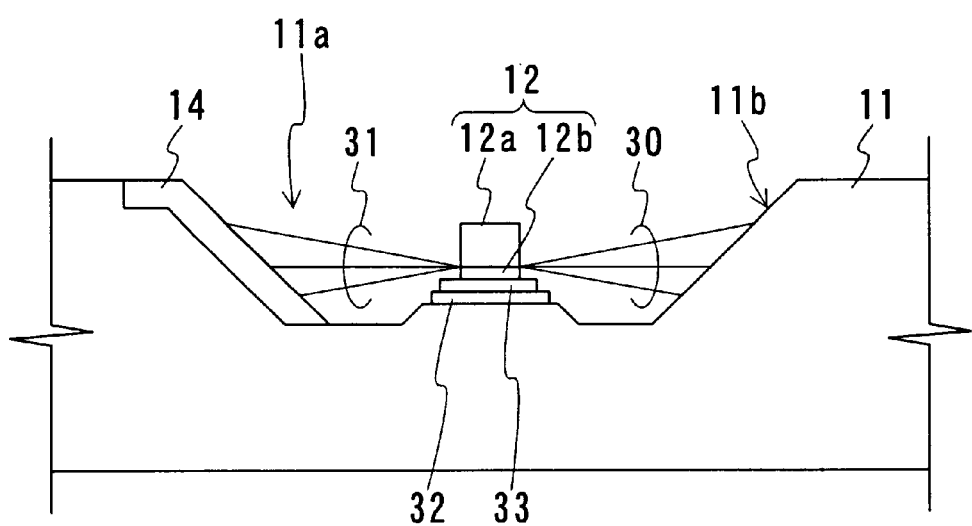
FIG. 3 is an enlarged view schematically showing a part of the semiconductor substrate of the optical pick-up head shown in FIG. 1.

The semiconductor substrate 11 is a p-type silicon substrate. The semiconductor substrate 11 is disposed in a package 22. The semiconductor substrate 11 is provided with a concave portion 11a. FIG. 3 is an enlarged view showing a part of the concave portion 11a. Side surfaces of the concave portion 11a are sloped so as to spread toward an opening portion. On one of the side surfaces of the concave portion 11a, a reflective surface 11b for reflecting a laser beam is formed. The reflective surface 11b can be formed by anisotropic etching. The second photodetector 14 is formed on a side surface of the concave portion 11a opposite to the reflective surface 11b.

Figure 6:
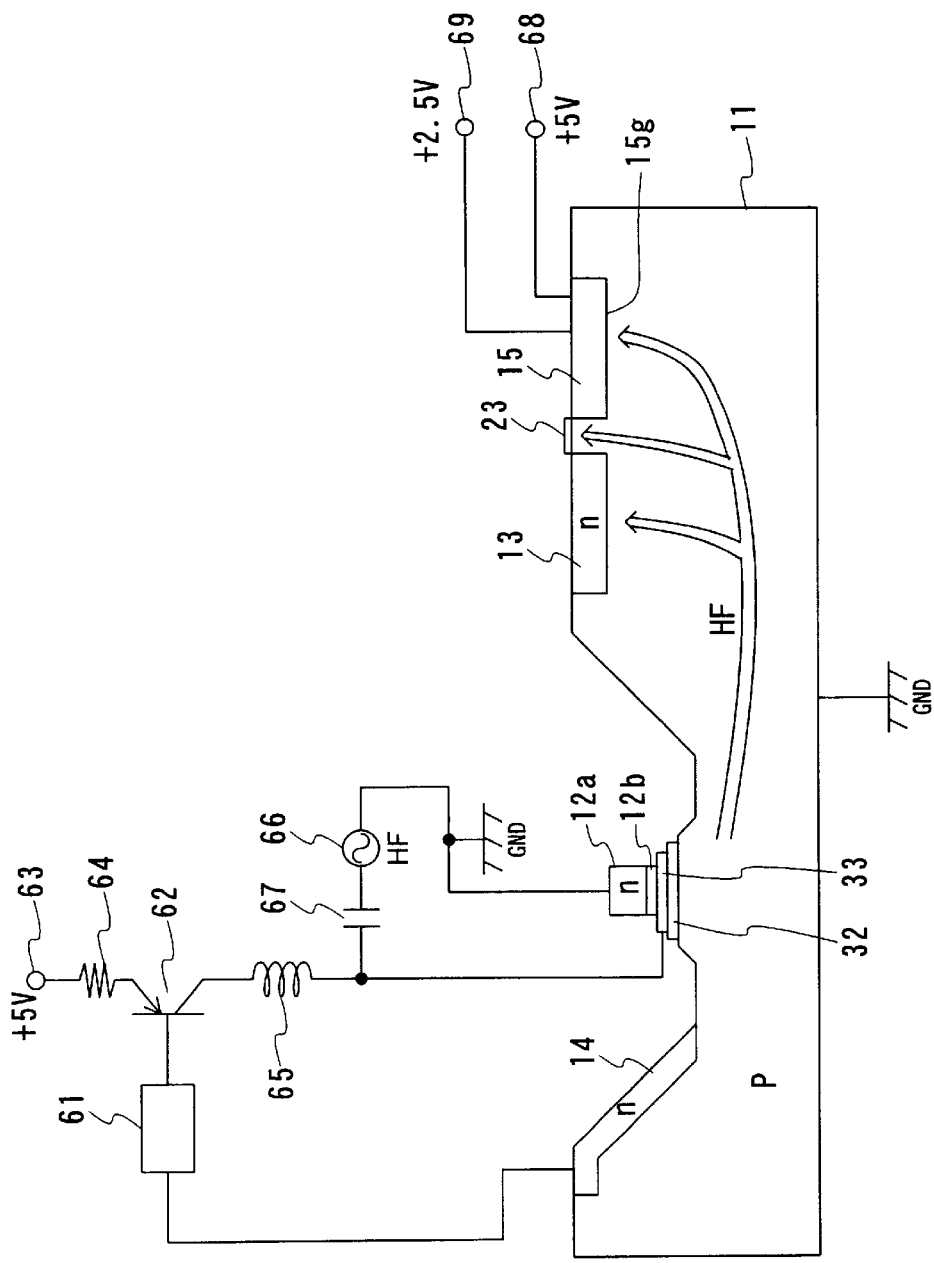
FIG. 6 is a diagram schematically illustrating a function of the optical pick-up head of the present invention.

The semiconductor laser 12 can be a single-mode oscillation semiconductor laser. More specifically, a laser using an active layer made of GaInP and a cladding layer made of p-type AlGaInP can be used. As shown in FIG. 3, the semiconductor laser 12 includes an n-type GaAs substrate 12a and a semiconductor layer 12b formed on the GaAs substrate 12a. The semiconductor layer 12b includes an active layer. On the concave portion 11a of the semiconductor substrate 11, an insulating layer 32 is formed. The semiconductor laser 12 is mounted on an electrode 33 formed on the insulating layer 32. The semiconductor laser 12 is mounted on the semiconductor substrate 11 via the insulating layer 32 so that an anode (the surface of the semiconductor layer 12b) is positioned on the semiconductor substrate 11 side. More specifically, the semiconductor laser 12 is mounted on the semiconductor substrate 11 so that the active layer lies closer to the semiconductor substrate 11 than the GaAs substrate 12a. Heat can be conducted satisfactorily between the active layer and the semiconductor substrate 11 by mounting the semiconductor laser 12 so that the surface of the semiconductor laser 12 closer to the active layer is positioned on the semiconductor substrate 11 side. As shown in FIG. 6, a cathode (the surface of the GaAs substrate 12a) of the semiconductor laser 12 is grounded.

The semiconductor laser 12 is supplied with a driving signal (current) having a high-frequency signal HF (high-frequency current) superimposed thereon. The high-frequency signal HF is applied to the semiconductor laser 12 for the purpose of preventing the output of a laser beam from fluctuating due to the laser beam that is reflected from an optical storage medium 40 and returns to the semiconductor laser 12.

As shown in FIG. 3, the semiconductor laser 12 emits linearly polarized diverging laser beams 30 and 31. The wavelength of the laser beams 30 and 31 is, for example, 650 nm. The laser beam 30 is reflected from the reflective surface 11b. The laser beam 31 is incident upon the second photodetector 14 formed on the sloped surface of the concave portion 11a.

As shown in FIG. 2, the first photodetector 13 includes four photodetectors 13a to 13d. The photodetectors 13a to 13d and the second photodetector 14 are photodiodes and respectively include a p-n junction formed by implanting impurities into the semiconductor substrate 11. The first photodetector 13 receives the laser beam 30 (diffracted light 30a to 30c) reflected from the optical storage medium 40 and split by the holographic optical element 17, and outputs a current signal in accordance with the light amount of the received laser beam 30 (diffracted light 30a to 30c). The second photodetector 14 directly receives the laser beam 31 emitted from the semiconductor laser 12, and outputs a current signal in accordance with the light amount of the laser beam 31.

Figure 5:
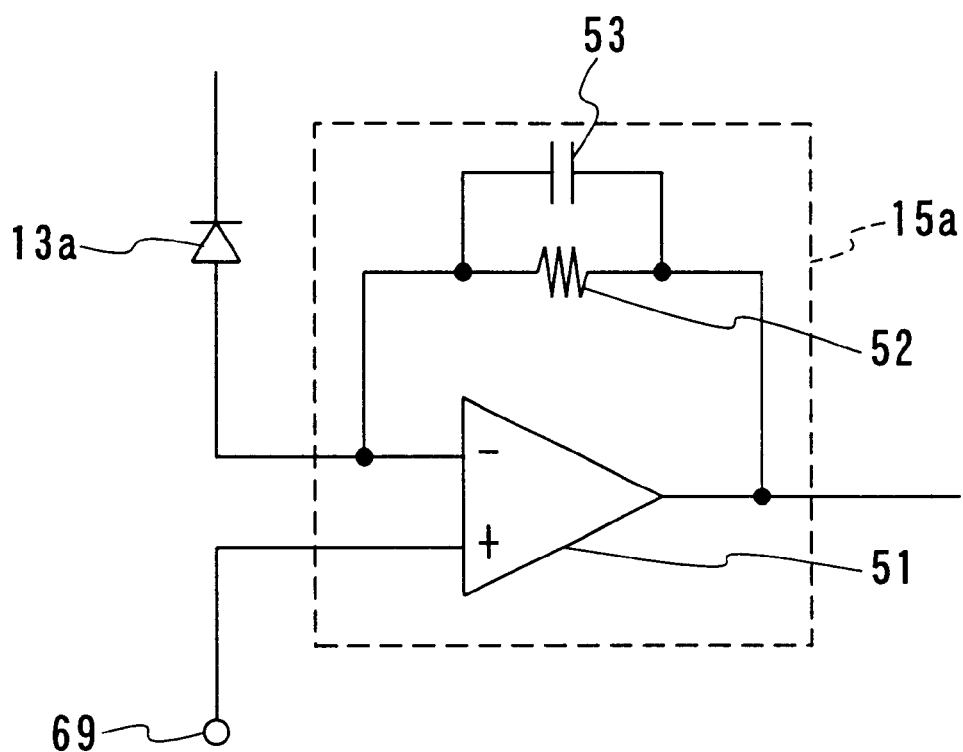
FIG. 5 is a diagram showing an exemplary current-voltage conversion circuit that can be used in the optical pick-up head shown in FIG. 1.

As shown in FIG. 2, the current-voltage conversion circuit 15 includes four current-voltage conversion circuits 15a to 15d formed monolithically on the semiconductor substrate 11. The respective current-voltage conversion circuits 15a to 15d respectively are connected to the photodetectors 13a to 13d via transmission line 23. The transmission line 23 is made of, for example, aluminum. The current-voltage conversion circuits 15a to 15d output voltage signals in accordance with the current signals output from the photodetectors 13a to 13d. As the current-voltage conversion circuits 15a to 15d, a general circuit as disclosed in JP 8(1996)-45098 A can be used. FIG. 5 shows an example of the current-voltage conversion circuit 15a, which also can be applied to the current-voltage conversion circuits 15b to 15d. The current-voltage conversion circuit 15a in FIG. 5 includes an operational amplifier 51, a resistor 52, and a capacitor 53. Such a current-voltage conversion circuit can be produced by an ordinary semiconductor process.

The holographic optical element 17 transmits the laser beam 30 emitted from the semiconductor laser 12. The holographic optical element 17 also splits the laser beam 30 reflected from the optical storage medium 40. In place of the holographic optical element 17, another splitting element for splitting the laser beam 30 may be used. As the collimating lens 18, for example, a lens with a focal length of 20 mm can be used. As the objective lens 19, for example, a lens with a focal length of 3 mm can be used. The opening of the objective lens 19 is limited by the aperture 20, the numerical aperture NA of which is, for example, 0.6.

The laser beam 30 emitted from the semiconductor laser 12 is reflected from the reflective surface 11b, passes through the holographic optical element 17, and is converted into parallel light by the collimating lens 18. The laser beam 30 converted into parallel light is collected by the objective lens 19, passes through a transparent substrate 40a of the optical storage medium 40, and is collected on an information recording surface 40b. The thickness of the transparent substrate 40a is, for example, 0.6 mm.

Figure 4:
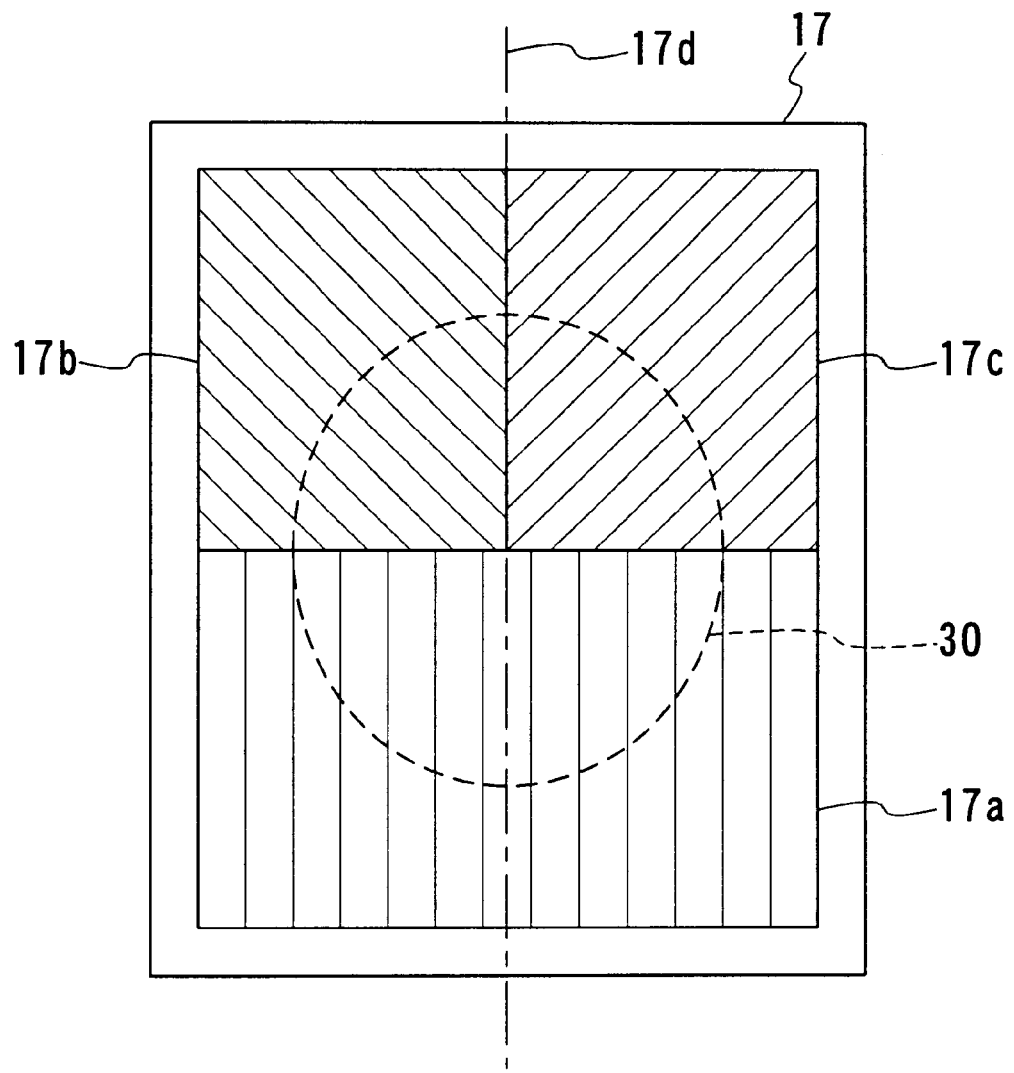
FIG. 4 is a diagram schematically showing a holographic optical element of the optical pick-up head shown in FIG. 1.

The laser beam 30 reflected from the information recording surface 40b passes through the objective lens 19 and the collimating lens 18, and is split to the diffracted light 30a to 30c by the holographic optical element 17. The holographic optical element 17 has three regions 17a to 17c (represented by hatching) as shown in FIG. 4. The holographic optical element 17 receives the beam 30 to generate the diffracted light 30a from the region 17a, the diffracted light 30b from the region 17b, and the diffracted light 30c from the region 17c. An axis 17d is parallel to a border line between the regions 17b and 17c. The holographic optical element 17 is disposed so that the axis 17d is parallel to a mapping of the information recording surface 40b by the laser beam 30.

The diffracted light 30a to 30c are received by the photodetectors 13a to 13d. More specifically, the photodetectors 13a and 13b receive the diffracted light 30a, the photodetector 13c receives the diffracted light 30b, and the photodetector 13d receives the diffracted light 30c. The photodetectors 13a to 13d output current signals in accordance with the amount of received light.

The current signals output from the photodetectors 13a to 13d are input to the current-voltage conversion circuits 15a to 15d via the transmission line 23. The current-voltage conversion circuits 15a to 15d output voltage signals in accordance with the input current signals.

A focus error signal of the laser beam 30 is obtained by a well-known Foucault process. More specifically, the focus error signal is obtained by conducting an arithmetic operation with respect to the signals output from the photodetectors 13a and 13b. A tracking error signal is obtained by a phase-difference method in the case where a medium is a DVD-ROM, whereas it is obtained by a push-pull method in the case where a medium is a DVD-RAM. More specifically, the tracking error signal is obtained by conducting an arithmetic operation with respect to the signals output from the photodetectors 13c and 13d. The tracking error signal is detected by using only a half of the laser beam 30 that is a far-field pattern (i.e., diffracted light 30b and 30c); however, the tracking error signal can be obtained in the same way as in the case of using the entire far-field pattern.

FIG. 6 shows a relationship between the high-frequency signal HF superimposed on the semiconductor laser 12 and the semiconductor substrate 11.

The current signal output from the second photodetector 14 is input to an output control circuit 61 for controlling the output from the semiconductor laser 12. A driving signal output from the output control circuit 61 is input to the base of a transistor 62 for driving a laser, whereby the operating current of the semiconductor laser 12 is controlled. A voltage of +5 volts is applied to a terminal 63. A resistor 64 for protection from an overcurrent is connected between the transistor 62 and the terminal 63. Furthermore, an inductor 65 connected to the transistor 62 is a filter for preventing electromagnetic interference caused by the high-frequency signal HF. Although only the inductor 65 is shown in FIG. 6, a low-pass filter using an inductor and a capacitor may be used.

The high-frequency signal HF is AC-coupled from an oscillator 66 via a coupling capacitor 67, and is supplied to the semiconductor laser 12. The frequency of a signal output from the oscillator 66 is, for example, in a range of 300 to 600 MHz. For example, it is 500 MHz. The high-frequency signal HF is applied to the semiconductor laser 12 via the electrode 33. Herein, the electrode 33 and the semiconductor substrate 11 are opposed to each other via the insulating layer 32, and the electrode 33 and the semiconductor substrate 11 generally are coupled by a capacitance of several pF to tens of pF. Therefore, the high-frequency signal HF is input to the first photodetector 13, the transmission line 23, and the current-voltage conversion circuit 15 via the semiconductor substrate 11, as well as the semiconductor laser 12.

The first and second photodetectors 13 and 14 are made of a pn-junction composed of the p-type semiconductor substrate 11 and the n-type region formed in the semiconductor substrate 11. Since the semiconductor substrate 11 is of a p-type, the semiconductor substrate 11 is grounded in the same way as in a general integrated circuit. The current-voltage conversion circuit 15 is supplied with a source voltage of +5 volts (based on a ground potential) from a terminal 68 and with a reference voltage of +2.5 volts (based on a ground potential) from a terminal 69.

In the optical pick-up head 10, the high-frequency signal HF supplied to the semiconductor laser 12 is input to the current-voltage conversion circuit 15 after passing through the first photodetector 13 and the transmission line 23 via the electrode 33, the insulating layer 32, and the semiconductor substrate 11. However, in the optical pick-up head 10, a similar voltage is applied to a side 15g (which is grounded) of the current-voltage conversion circuit 15. Therefore, the high-frequency signal HF is canceled in the current-voltage conversion circuit 15. Because of this, an offset is unlikely to occur in a signal output from the current-voltage conversion circuit 15, whereby a highly reliable information recording/reproducing apparatus can be realized. In particular, as the distance between the first photodetector 13 and the current-voltage conversion circuit 15 is smaller, an offset can be decreased. This distance preferably is 10 mm or less. On the other hand, in the case where the current-voltage conversion circuit 15 is not formed on the semiconductor substrate 11, the interference level of the high-frequency signal HF is varied between the first photodetector 13 and the current-voltage conversion circuit 15. Consequently, an offset of a signal is increased.

Due to the use of the optical pick-up head 10, unlike the inventions disclosed in JP 8(1996)-45098 and JP 7(1995)-287857, there is no need to provide a band limiting unit between the photodetector and the current-voltage conversion circuit. Furthermore, unlike the invention disclosed in JP 6(1994)-290475, even if a shielding unit for a high-frequency signal is not provided, an offset can be prevented from occurring in the focus error signal and the tracking error signal. Furthermore, due to the use of the optical pick-up head 10, the output of the semiconductor laser 12 is stabilized. Therefore, the information recording/reproducing apparatus using the optical pick-up head 10 can read information recorded on an optical storage medium with accuracy.

In the optical pick-up head 10, the semiconductor laser 12 having the semiconductor layer 12b formed on the n-type GaAs substrate 12a is used, and its cathode side is grounded. Such a method generally is used, so that a general laser driving circuit and high-frequency oscillating circuit can be applied thereto. As a result, the optical pick-up head 10 can be produced at low cost. Furthermore, even when a switching power source is used for generating a source voltage of +5 volts, the cathode of the semiconductor laser 12 is grounded, and the transistor 62 is interposed between the terminal 63 of +5 volts and the anode of the semiconductor laser 12. Therefore, the semiconductor laser 12 is unlikely to be influenced by switching noise from the switching power source, and a laser output can be stabilized. Furthermore, the withstand voltage of the semiconductor laser 12 with respect to a sporadic surge mixed from the terminal 63 of +5 volts is increased.

The frequency of the high-frequency signal HF generally is set in a range of 300 to 600 MHz for the following reasons: the semiconductor laser 12 has a peculiar cutoff frequency, and an unwanted emission increases as a frequency f2 of the high-frequency signal HF becomes higher. In the case where a DVD-ROM is read at a 16-times speed, it is required to increase a frequency f1, at which the gain of the current-voltage conversion circuit 15 becomes −3 dB, to about 150 MHz. The optical pick-up head of the present invention is unlikely to be influenced by the high-frequency signal, even if the band of the current-voltage conversion circuit is widened; therefore, an information recording/reproducing apparatus is obtained that allows information to be read at a high speed.

In a conventional information recording/reproducing apparatus, it is required to prescribe the ratio between the frequency of the high-frequency signal HF and the frequency of the current-voltage conversion circuit to be about 10 or more. Therefore, when it is attempted to widen the frequency band of the current-voltage conversion circuit to 150 MHz, it is required to prescribe the frequency of the high-frequency signal to be 1 GHz or more. Consequently, in a conventional apparatus, an unwanted emission of the high-frequency signal becomes too large to cope with, and the frequency of the high-frequency signal becomes higher than the cut-off frequency of a laser, whereby a laser beam becomes unlikely to be modulated. In contrast, it becomes possible to satisfy the relationship $f2/f1 \leq 5$ by using the optical pick-up head of the present invention; therefore, the above-mentioned problem can be avoided.

In the optical pick-up head 10, only the insulating layer 32 is present between the electrode 33 connected to the semiconductor laser 12 and the semiconductor substrate 11. However, according to the present invention, the semiconductor laser 12 mounted on a submount may be provided on the insulating layer 32. Because of this, the resistance of the submount is present between the electrode 33 and the semiconductor substrate 11, whereby leakage of the high-frequency signal HF into the first photodetector 13 and the current-voltage conversion circuit 15 is reduced and the influence of the high-frequency signal HF further is decreased. In this case, the specific resistance of the submount preferably is large.

Furthermore, in the optical pick-up head of the present invention, a feedback type differential amplifier may be used in the current-voltage conversion circuit 15. In this case, it is preferable that a current signal from the first photodetector 13 is input to a minus input of the differential amplifier, a reference voltage is input to a plus input of the differential amplifier, and a capacitor of several pF or more is provided between the plus input and the GND. Due to this construction, the high-frequency signal HF mixed into the current-voltage conversion circuit 15 via the semiconductor substrate 11 is input as an in-phase signal to the differential amplifier, whereby the influence of the high-frequency signal further is decreased. As the feedback type differential amplifier, for example, the construction as disclosed in FIG. 1 in JP 8(1996)-45098 A is applicable.

Furthermore, although the photodetector has a simple p-n structure in Embodiment 1, it may have any structure, for example, a p-i-n structure formed by epitaxial growth.

Furthermore, the current signal output from the first photodetector 13 is input to the output control circuit 61 in Embodiment 1. However, in the case of controlling an output at a high speed, the current-voltage conversion circuit for converting a current signal output from the first photodetector 13 into a voltage signal may be formed on the semiconductor substrate 11. According to this construction, the output from the semiconductor laser 12 is stabilized, so that the optical pick-up head that is unlikely to be influenced by the high-frequency signal HF is provided.

Furthermore, although a focus error signal is calculated by using a Foucault process in Embodiment 1, various alterations can be made without departing from the spirit of the present invention.

Furthermore, although the optical pick-up head has been described based on the case where the semiconductor substrate 11 is of a p-type, the semiconductor substrate 11 may be an n-type. Furthermore, the semiconductor substrate 11 may be made of any semiconductor. Furthermore, there is no particular constraint to a structure and a wavelength of a semiconductor laser.

Furthermore, a supply voltage of +5 volts and a reference voltage of +2.5 volts are exemplary, and a desired voltage can be designed.

Embodiment 2

In Embodiment 2, an exemplary information recording/reproducing apparatus of the present invention will be described. The portions described in Embodiment 1 are denoted by the same reference numerals as those therein, and hence, the description thereof will be omitted here.

Figure 7:
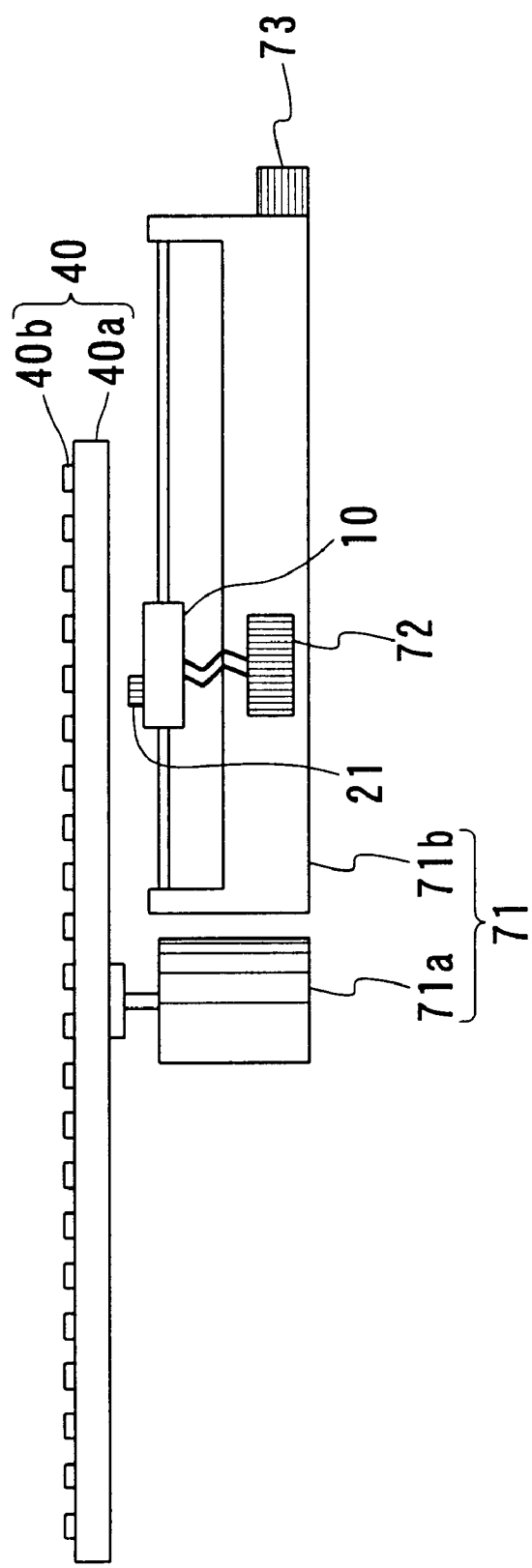
FIG. 7 is a diagram schematically showing an exemplary information recording/reproducing apparatus of the present invention.
Figure 8:
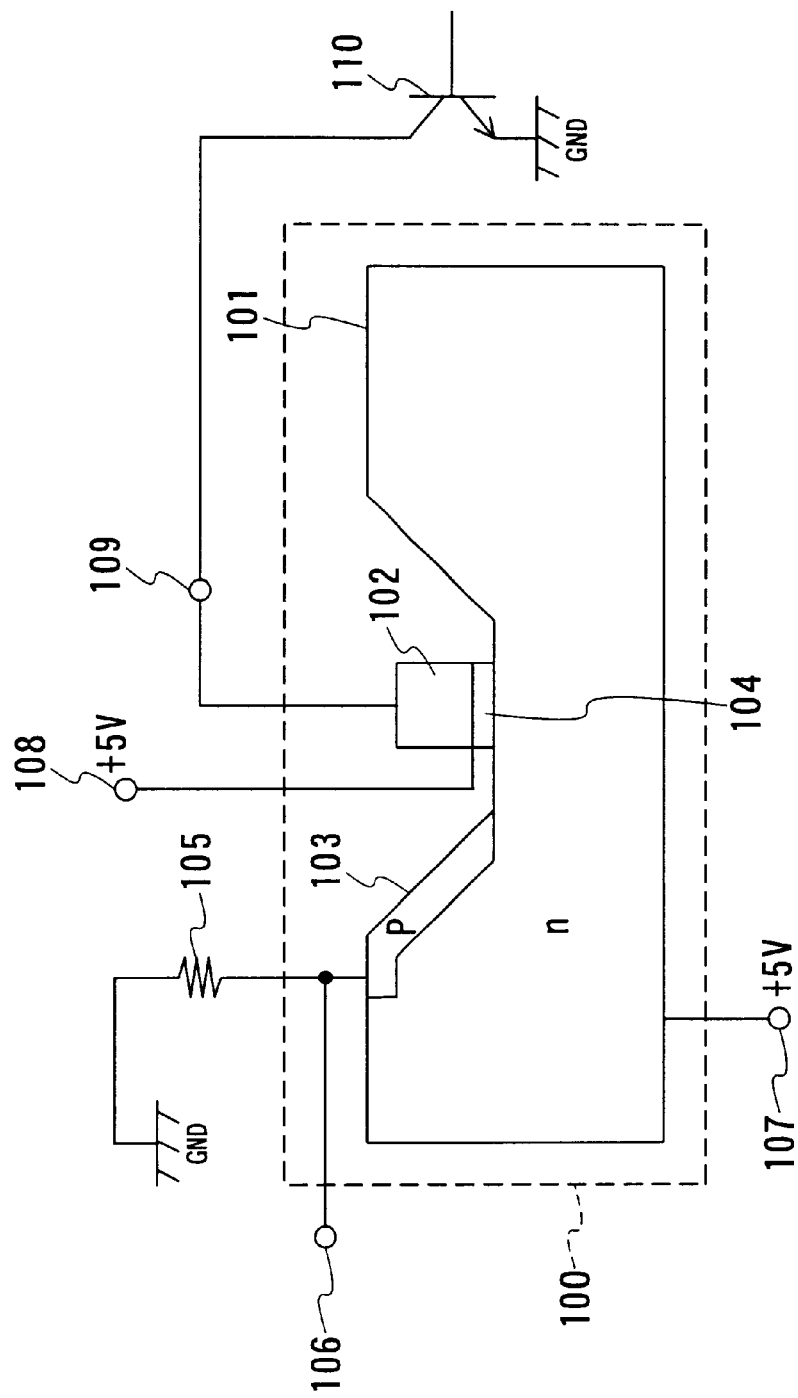
FIG. 8 is a diagram showing an exemplary semiconductor substrate of a conventional optical pick-up head.

FIG. 7 schematically shows a structure of an information recording/reproducing apparatus of Embodiment 2. The information recording/reproducing apparatus of Embodiment 2 at least reproduces information from an optical storage medium, and may record information onto an optical storage medium.

Referring to FIG. 7, the information recording/reproducing apparatus of Embodiment 2 includes an optical pick-up head 10 described in Embodiment 1, a driving unit 71, an electrical circuit 72, and a power source portion 73.

The driving unit 71 changes the relative position between the optical storage medium 40 and the optical pick-up head 10. The driving unit 71 includes a motor 71a and a driving portion 71b. A motor 71a rotates the optical storage medium 40. The driving portion 71b moves the optical pick-up head 10. As the driving portion 71b, a linear motor, a traverse mechanism using a rack and pinion, and the like can be used.

The electrical circuit 72 includes a signal processing circuit for obtaining information recorded on the optical storage medium 40 by using a signal output from the optical pick-up head 10. In the electrical circuit 72, information recorded on the optical storage medium 40 is demodulated. Furthermore, the electrical circuit 72 receives a signal regarding the position of the optical storage medium 40 from the optical pick-up head 10. The electrical circuit 72 amplifies or conducts an arithmetic operation with respect to this signal, thereby moving the optical pick-up head 10 or the objective lens 19 in the optical pick-up head 10. The objective lens 19 is driven by an actuator 21. As the electrical circuit 72, those which generally are used in an information recording/reproducing apparatus can be used. In the information recording/reproducing apparatus of Embodiment 2, a focus servo and a tracking servo are conducted with respect to the optical storage medium 40 by the above-mentioned signal and the driving portion 71b or the actuator 21, whereby information is read, written, or deleted with respect to the optical storage medium 40.

The power source portion 73 is a power source or a connecting portion to an external power source. The driving unit 71, the electrical circuit 72, and the actuator 21 are supplied with electricity from the power source portion 73. The power source or the connecting terminal to the external power source respectively may be provided in each driving circuit.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical pick-up head, comprising:

a first substrate made of a semiconductor;

a semiconductor laser mounted on the first substrate;

a photodetector for receiving a laser beam emitted from the semiconductor laser and reflected from an optical storage medium and outputting a current signal in accordance with a light amount of the received laser beam;

a current-voltage conversion circuit for converting the current signal into a voltage signal, wherein the semiconductor laser is supplied with a high-frequency signal for preventing an output from fluctuating due to the laser beam reflected from the optical storage medium, the photodetector and the current-voltage conversion circuit are formed on the first substrate monolithically; and the distance between the photodetector and the current-voltage conversion circuit is 10 mm or less.

2. The optical pick-up head according to claim 1, wherein the first substrate is of a p-type.

3. The optical pick-up head according to claim 1, wherein the semiconductor laser includes a second substrate and an active layer formed above the second substrate, the semiconductor laser is mounted on the first substrate so that the active layer is closer to the first substrate than the second substrate; and the frequency of the high-frequency signal is set in a range of 300 to 600 MHz.

4. The optical pick-up head according to claim 1, wherein a frequency f1, at which a gain of the current-voltage conversion circuit becomes −3dB, and a frequency f2 of the high-frequency signal satisfy a relationship $f2/f1 \leq 5$.

5. An information recording/reproducing apparatus for at least reproducing information from an optical storage medium, comprising:

the optical pick-up head of claim 1;

a driving unit for changing a relative position between the optical storage medium and the optical pick-up head; and a signal processing circuit for obtaining information recorded on the optical storage medium by using a signal output from the optical pick-up head.

* * * * *